(No Model.)
W. CABLE.
ART OF TREATING PLASTIC RUBBER COMPOUNDS.
No. 526,483. Patented Sept. 25, 1894.
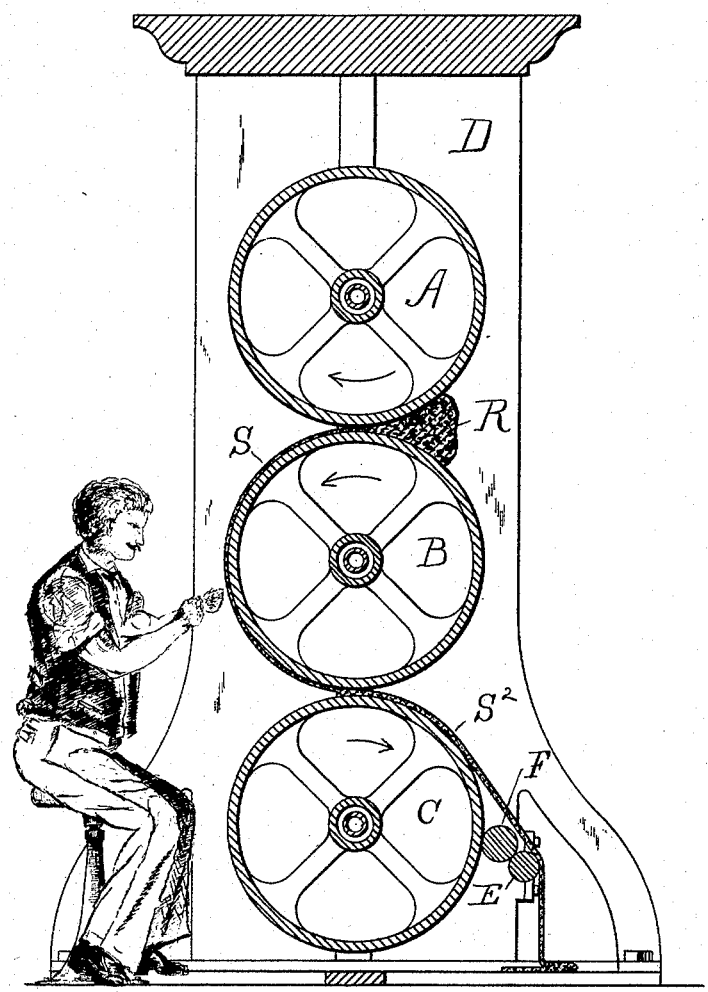
WITNESSES.
Thos. J. Kenny
Chas. F. Crafts
INVENTOR.
Wheeler Cable
by A. H. Spencer
ATT'Y

UNITED STATES PATENT OFFICE.

WHEELER CABLE, OF BOSTON, MASSACHUSETTS.

ART OF TREATING PLASTIC RUBBER COMPOUNDS.

SPECIFICATION forming part of Letters Patent No. 526,483, dated September 25, 1894.

Application filed August 7, 1893. Serial No. 482,533. (No specimens.)

*To all whom it may concern:*

Be it known that I, WHEELER CABLE, of Boston, in the county of Suffolk and State of Massachusetts, have invented a new and useful Improvement in the Art of Treating Plastic Rubber Compounds, of which the following, taken in connection with the accompanying drawings, is a specification.

My invention is an improvement in the art of treating plastic rubber compounds, and especially those wherein the rubber is largely or entirely such as is known as "reclaimed," that is old rubber worked over.

Vast quantities of this stock are annually used, and for many purposes it is scarcely inferior in serviceability to fresh gum, while its cost is but a small fraction of that of new rubber. Great care in treating it is, however, necessary, especially where it is to be subsequently spread thin to serve as a coating for woven or other fabrics, which are to be thereby rendered water-proof. For this purpose it has long been common to treat the compound in a calender, between the upper and middle rolls of which it passes in a very thin sheet, so that the workman, scanning this sheet with quick, practiced eye, may remove, while it is passing downwardly on the middle roller any considerable particles of foreign matter, the presence of which in the compound would cause imperfections in the coating when subsequently spread. To remove these impurities it is absolutely essential that the plastic sheet shall be so thin that they are visible in it and may be picked out as the material passes. For practical success this should be done, without stopping the machine unnecessarily. Right here a difficulty hitherto insurmountable has arisen. The middle calender roll soon becomes materially heated, and the plastic sheet, having a thickness not much exceeding the hundredth part of an inch, clings to the roller surface, tending to follow it upwardly and again pass between the upper and middle rollers, thus clogging the machine or making it inoperative until stopped, and the roller cooled. This is because there is not sufficient tenacity in the thin sheet of this reclaimed rubber to pull it away from the roller; but if the sheet passes before the workman's eye with sufficient thickness to insure its removal freely from the roller he cannot see the most of the impurities, and hence the stock will be of inferior quality and the coating subsequently applied to the fabric will be full of minute holes. My improved method solves this difficulty in a very simple manner, yet one that has hitherto eluded the thoughts of skilled workmen notwithstanding the urgent need of relief for many years. Instead of thickening the sheet where it passes for inspection before the workman's eyes, or attempting to remove it while so very thin, I double its thickness automatically after it has been inspected. To do this practically and conveniently I gear the lower roller to run at about half the surface speed of the middle one, with which it is in close proximity, thereby causing the sheet to be transferred from the roller on which it was inspected to the surface of the lower roller and to be simultaneously about doubled in thickness owing to such reduction in speed and to the increased distance between the lower rollers. This increase in thickness gives to the sheet sufficient body and cohesiveness to insure its ready separation from the roller surface. For this purpose I provide a small delivery roller in rear of the lower calender roller, and belted to it or otherwise driven at somewhat higher speed so as to pull the sheet away from the calender. From this small roller the rubber sheet, inspected on the middle calender roller and subsequently thickened, is delivered continuously without the slightest recurrence of the former difficulty.

The drawing is a transverse vertical section through a calender, furnished with my supplementary roller, and adapted to the practice of my improved method.

A, B, C are the three cylindrical steel rollers, mounted in the usual bearings in the upright standard D of the frame,—the middle roller B being in fixed bearings and the rollers A and C capable of accurate adjustment toward and from it.

The plastic mass of rubber R under treatment is shown in the bight of the rollers A, B which are geared to turn with equal speed or the middle roller at a higher speed than the upper roller A. They are for my purpose, set very closely together, leaving only space for a sheet S about the hundredth part of an inch in thickness spread uniformly over a portion of the surface of the roller B and passing slowly downwardly before the watchful eyes of the workman, who is thus enabled to detect any considerable impurities therein, and remove them by a quick movement of the hand, leaving a ragged hole in the thin sheet of stock. This hole is of no possible consequence, since the only object is to free the stock from foreign matter, the rubber being again massed and subsequently treated in other machines for surfacing fabrics to be water-proofed and for other purposes.

The rollers B and C are set about twice as far apart as the rollers A and B, and are geared together, the gear wheel on the lower roller having about twice as many teeth as that on the middle roller so that the one shall revolve with about half the surface speed of the other. This difference in speed causes the rubber sheet $S^2$ to part from the middle roller and move downwardly on the opposite side of the slower roller C. Simultaneously with and in consequence of this change of speed the soft rubber sheet substantially doubles in thickness, the two rollers being far enough asunder to insure this.

Back of the lower roller C I mount the small delivery roller E in suitable bearings, and I cause it to revolve at a surface speed sufficiently faster than the roller C to overcome the stretch of the sheet, and to pull it free. This I do by belting it to said roller C or by an interposed friction wheel F of proper diameter. This simple attachment pulls the thickened sheet $S^2$ continuously from the roller C and deposits it on the platform, or otherwise, in folds or layers forming a plastic mass for subsequent treatment, the impurities having been detected and picked out while the compound was rolled down thin, and the desired tenacity in the sheet enabling it to be removed alone, accompanying its thickening.

Under my improvement, with less manual labor than has heretofore been required, I can turn out daily, without any trouble, twice as much of the finished product as was practicable under the old system, with its waste of time and constant annoyance. The value of this improvement, as applied simply to the treatment of the millions of pounds of old rubber annually reclaimed, will be apparent.

I claim as my invention—

1. The improvement in the art of treating plastic rubber compounds, which consists in spreading such material in a very thin sheet upon a moving surface, inspecting and removing impurities therefrom while so spread and moving, and then thickening said sheet at its forward end and removing the thickened sheet from its carrying surface, substantially as and for the purpose set forth.

2. The improvement in the art of treating reclaimed rubber compounds, consisting in spreading such material in a very thin sheet, inspecting and removing impurities therefrom while so spread and moving forward, then transferring such material to a surface moving at a reduced speed, and simultaneously increasing the thickness of the sheet in a corresponding ratio, and subsequently removing the thickened sheet from said surface and depositing it in a mass, substantially as set forth.

3. The combination of the calender rollers A B, geared for moderate surface speed, with the lower calender roller C geared to run at about half said speed, and with the supplementary delivery roller E driven at somewhat higher speed and adapted to pull the thickened sheet of compound alone from such slow roller, substantially as and for the purpose set forth.

In testimony whereof I have signed my name to this specification, in the presence of two subscribing witnesses, on this 30th day of March, A. D. 1893.

WHEELER CABLE.

Witnesses:
JOHN C. LANE,
L. E. TALMADGE.